(12) United States Patent
Bradley et al.

(10) Patent No.: US 6,666,335 B1
(45) Date of Patent: Dec. 23, 2003

(54) MULTI-MINERAL/ASH BENEFICATION PROCESS AND APPARATUS

(75) Inventors: William M. Bradley, Catlettsburg, KY (US); Robert L. Carnahan, Huntington, WV (US); Frank A. Elk, Huntington, WV (US); Riley D. Robbins, Beckley, WV (US); William M. Lewis, Candler, NC (US); Robert M. Lewis, Candler, NC (US)

(73) Assignee: C.A.S.T. Minerals, Inc., Huntington, WV (US)

( * ) Notice: Subject to any disclaimer, the term of this patent is extended or adjusted under 35 U.S.C. 154(b) by 366 days.

(21) Appl. No.: 09/698,757

(22) Filed: Oct. 27, 2000

Related U.S. Application Data

(60) Provisional application No. 60/162,625, filed on Oct. 29, 1999.

(51) Int. Cl.$^7$ .................................................. B03D 1/08
(52) U.S. Cl. ............................ 209/3; 209/10; 209/12.1; 209/17; 241/24.1
(58) Field of Search .......................... 209/3, 10, 12.1, 209/17, 38, 39, 155, 208; 241/24.1, 24.11, 24.14

(56) References Cited

U.S. PATENT DOCUMENTS

| | | | | |
|---|---|---|---|---|
| 3,737,032 A | * | 6/1973 | Burkitt | .......................... 209/10 |
| 4,477,353 A | * | 10/1984 | Messer | ...................... 209/5 X |
| 4,961,843 A | | 10/1990 | Lewis | ..................... 209/158 X |
| 5,413,703 A | * | 5/1995 | Greenwald, Sr. | .......... 209/17 X |
| 5,794,791 A | * | 8/1998 | Kindig | ...................... 209/17 X |
| 6,578,783 B2 | * | 6/2003 | Simon et al. | ............. 241/24.14 |
| 6,599,434 B2 | * | 7/2003 | Mullins | ....................... 210/785 |

FOREIGN PATENT DOCUMENTS

| | | | | |
|---|---|---|---|---|
| EP | 318231 | * | 5/1989 | .................. 209/17 |
| SU | 1487992 | * | 6/1989 | .................. 209/17 |
| SU | 1627250 | * | 2/1991 | .................. 209/17 |

* cited by examiner

Primary Examiner—Donald P. Walsh
Assistant Examiner—Daniel K Schlak
(74) Attorney, Agent, or Firm—Carter Schnedler-Monteith

(57) ABSTRACT

There is provided a method and apparatus for segregating ponded coal combustion materials for use in various products, such as block sand products, concrete or mid-size sand products and fine ash products. After screening ponded coal combustion raw materials to remove the first size material for use as a block sand product, the remaining material passes through a rotating magnetic separator to remove iron bearing materials and then to a hydraulic classifier for separating coarse materials, middling size materials and fine materials. The coarse materials are combined with the first size materials and are de-watered to form the block sand product. The middling size materials are segregated into low, middle and high specific gravity materials by the use of spirals. The low specific gravity material is passed through a sizing sleeve and coarse low specific gravity material is combined with the middle specific gravity material and are de-watered to form a concrete or mid-size sand product. Fines from the hydraulic classifier are screened to form the fine ash product.

4 Claims, 2 Drawing Sheets

MULTI-MINERAL/ASH BENEFICATION PROCESS AND APPARATUS

CROSS-REFERENCE TO PROVISIONAL PATENT APPLICATION

The benefit of U.S. Provisional Patent Application Serial No. 60/162,625, filed Oct. 29, 1999, is claimed.

BACKGROUND OF THE INVENTION

This invention relates to methods and apparatus for segregating materials from a common source for different applications. More particularly, it relates to methods and apparatus for segregating pond coal combustion materials.

Coal fired electric power plants use holding ponds for the byproducts of coal combustion. These ponded materials can contain many types of minerals and other materials, including ash, carbon, pyrites and magnetics. It is environmentally desirable to use these ponded materials rather than treat or handle them as waste. In order for this ponded coal combustion material to be converted to useful construction materials, the materials must be segregated, and certain parts of the materials, such as pyrites, magnetics and carbon must be removed therefrom.

OBJECTS OF THE INVENTION

It is, therefore, one object of this invention to provide an improved method for segregating ponded coal combustion materials.

It is another object of this invention to provide a method for segregating ponded coal combustion materials into materials which are suitable for block sand products, concrete or mid-size sand products and fine ash products.

SUMMARY OF THE INVENTION

In accordance with one form of this invention there is provided a method for segregating ponded coal combustion materials.

The materials are first removed from the pond. The materials are fed to a screening system, thereby segregating a first size material from the remainder of the materials. Preferably, a magnetic separator removes the iron bearing materials from the remainder of the materials. The remainder of the materials are fed to a hydraulic classifier apparatus. A coarse material is discharged from a first output of the hydraulic classifier apparatus, and a middling size material is discharged from a second output of the hydraulic classifier apparatus.

The middling size material is segregated by low, middle and high specific gravities. Preferably, the low specific gravity middling material is fed to a sizing sleeve where coarse low specific gravity middling material is segregated. Also, preferably, the coarse low specific gravity middling material is combined with middle specific gravity middling material, and after de-watering, forms a concrete or mid-size sand product. Also, preferably, the coarse materials from the hydraulic classifier is combined with the first size material, and after de-watering, forms a block sand product.

BRIEF DESCRIPTION OF THE DRAWINGS

The subject matter which is regarded as the invention is set forth in the appended claims. The invention itself, however, together with further objects and advantages thereof may be better understood in reference to the following descriptions taken in conjunction with the accompanying drawings in which:

FIG. 2 is taken on line 1—1 in FIG. 3;

DESCRIPTION OF THE PREFERRED EMBODIMENT

Figure 1:
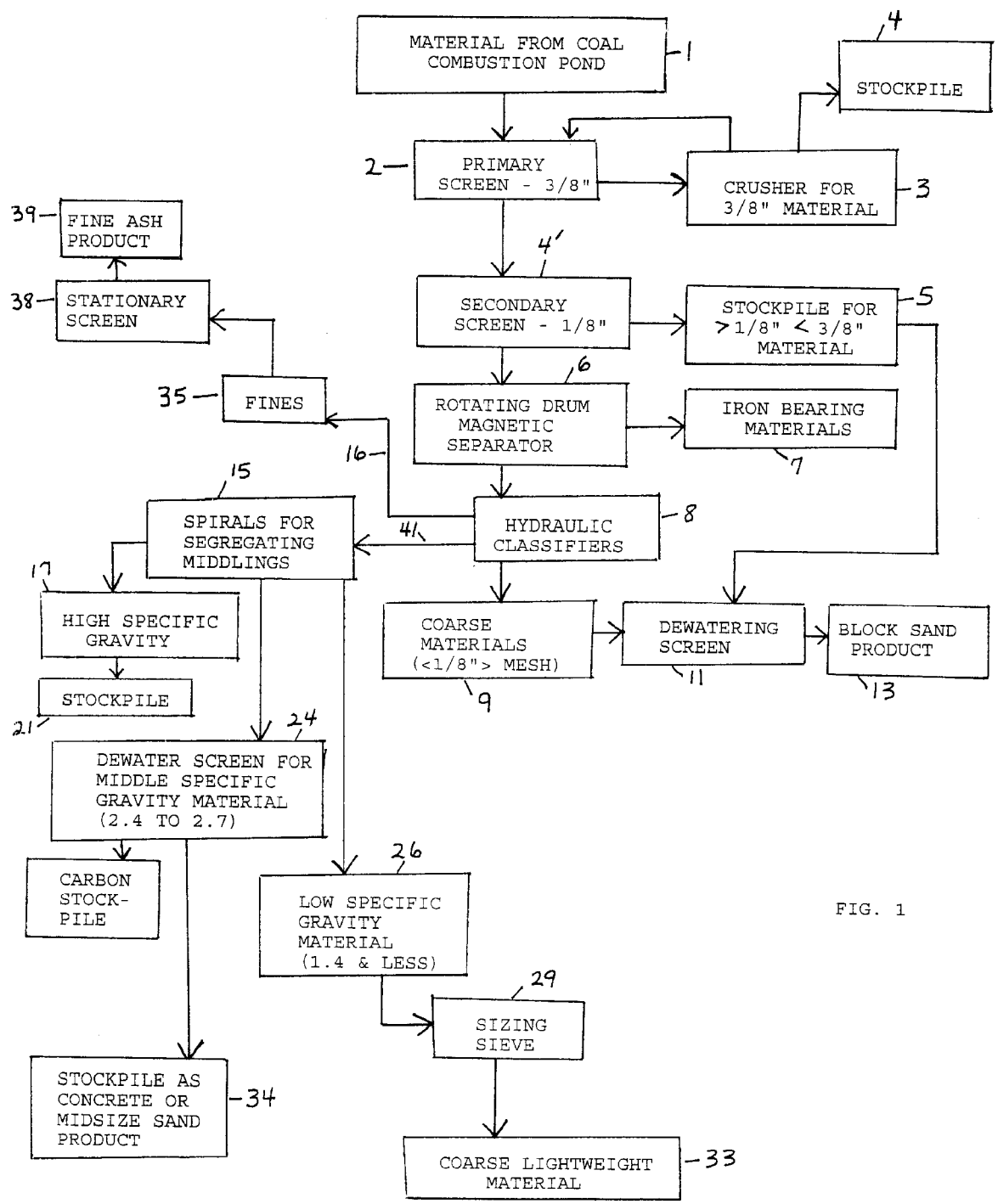
FIG. 1 is a block diagram showing the method of the preferred embodiment of the subject invention.

FIG. 1 is a block diagram showing the preferred method of the subject invention. The references to particle sizes are given as general examples for a clearer understanding of the overall process, however, the process is not limited to specific particle sizes. Ponded materials from a coal combustion power plant can contain many types of materials and minerals, including ash, pyrites, carbon and magnetics.

As illustrated by block 1, raw feed material from the coal combustion pond is either dredged or dry mined in a fashion to feed the separation system described below. The typical feed includes a variety of sized particles. Generally, the particles are less than 0.4 inch diameter. The feed material is introduced to a primary sizing screen, as illustrated by block 2. The primary sizing screen removes greater than ⅜ inch diameter particles, which are fed to a crusher, as illustrated by block 3. The crusher provides size reduction and the crushed material can be either reintroduced to the primary screen or stockpiled, as illustrated by block 4, as an oversized aggregate.

Materials which pass through the ⅜ inch screen fall onto a ⅛ inch secondary screen is illustrated by block 4'. The material which does not pass through the ⅛ inch screen is collected on a conveyor belt and stockpiled, as illustrated by block 5. Material which passes through the ⅛ inch screen is fed to a magnetic separator which, preferably, is a rotating drum magnetic separator, as illustrated by block 6. Rotating drum magnetic separators are commercially available from STRNS Magnetics or ERIZ Company. Iron bearing materials are removed as magnetics from the rotating drum magnetic separator, as illustrated by block 7.

Nonmagnetic materials pass through the rotating drum magnetic separator and are fed into a hydraulic classifier for hydraulic classification. The hydraulic classifier is illustrated by block 8. The preferred hydraulic classifier is the Lewis Econosizer, which may be available from Lewis Minerals Corporation. The Lewis Econosizer is described and claimed in U.S. Pat. No. 4,961,843. Using the differences in specific gravity size and shape, the Econosizer separates the particles based on their effective settling velocities. Coarse, heavy particles report to the lower chambers of the Econosizer, while progressively finer particles settle out in the flared section of the Econosizer. These finer particles are removed for further processing. The ultra-fine (less than 200 mesh in diameter) report off the top of the Econosizer. The Lewis Econosizer is shown in FIGS. 2–5 and is described in detail below.

Figure 2:
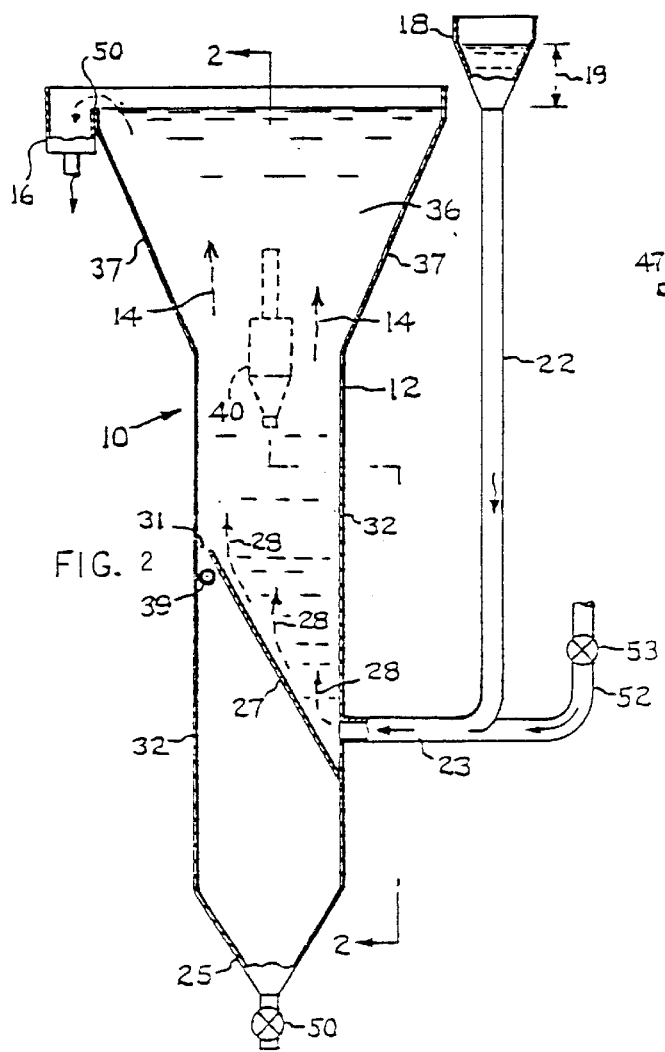
FIG. 2 is a sectional view of the hydraulic classifier listed in FIG. 1.

FIG. 2 shows particle separator 10 comprising a liquid-containment column 12 designed to extend vertically. Liquid (with entrained particles) is caused to flow upwardly within the column, as indicated by arrows 14 and 28 in FIG. 2. Relatively clear (particulate free) effluent, slime, or extreme fine size particles according to desired separation, is discharged from the upper end of the column into a box (tray) 16.

The feed liquid (containing particulates of varying size) is initially fed into a hopper 18 located a predetermined distance 19 above the upper end of column 12. A pipe 22 extends downwardly from hopper 18 and thence laterally, as at 23, to connect with the side wall of the column. Pipe section 23 defines the admission point of the feed stock liquid into the column. The movement of material through the column is controlled by auxiliary water added at 52. The admission point is a considerable distance below the upper end of the column, but above the column lower end (defined by hopper 25). The hopper is for retaining the accumulated coarse material and is not considered as taking part in the sizing separation.

Liquid is discharged from pipe section 23 onto an inclined baffle plate 27 fixedly located in the column at a point in horizontal registry with pipe section 23. Plate 27 is tapered from its upper left edge to its lower right edge to form a modified inverted pyramid section. Plate 27 redirects the liquid (and entrained particulates) to flow upwardly in the column, as indicated by arrows 28 and 14 in FIG. 1. The exact inclination of plate 27 is not critical to practice of the invention. However an inclination angle of about sixty degrees is thought to give satisfactory results.

Plate 27 extends upwardly (and leftwardly) from a point slightly below the liquid admission point to a point almost, but not quite, reaching the opposite side wall of the column. The upper left edge of plate 27 is spaced a slight distance from the adjacent column side wall to define an overflow gap 31. The term "overflow" is used to indicate a potential for coarse particles to flow downwardly through the gap into hopper 25.

Column 12 has an essentially square cross section, at least in the zone thereof that contains baffle plate 27. Each of the four column side walls 32 is a flat vertical wall arranged at right angles to the other column side walls. The column could have a round, oblong or other cross section. However, a square cross-sectional configuration represents the preferred construction.

The baffle plate redirects the entrance velocity or flow from admission point 23 so that the material will be given a start up the vertical column. The coarse size particulates cannot rise at the prevailing upward flow velocity, and are thus forced to flow down through slot 31 at the end of the baffle plate.

Liquid reaching overflow gap 31 contains mostly coarse size particles with some fine size particles. There is a potential for some of the fine size particles to move downwardly through gap 31. To prevent such action, I provide an auxiliary liquid water header just below gap 31. The water header comprises a horizontal pipe 39 having a series of closely spaced openings in its upper surface. An auxiliary water source feeds water into pipe 39, whereby water jets are directed upwardly toward gap 31. A valve in pipe 39 is adjusted so that the upward flow out of the pipe is just enough to prevent the fine size particles in stream 28 from moving downwardly through gap 31 into collecting hopper 25. However the flow is not so great as to prevent the coarse size particles from moving downwardly through gap 31 into collecting hopper 25.

The finer size particles in the up-flowing liquid stream are carried upwardly within the stream into an outwardly flaring column section 36 defined by four flat walls 37. The flaring nature of column section 36 causes the liquid to have a progressively lower vertical velocity as it moves upwardly toward the extreme upper end of column section 36. The progressively lowered velocity is advantageous in that it promotes separation of finer size particles.

Figure 3:
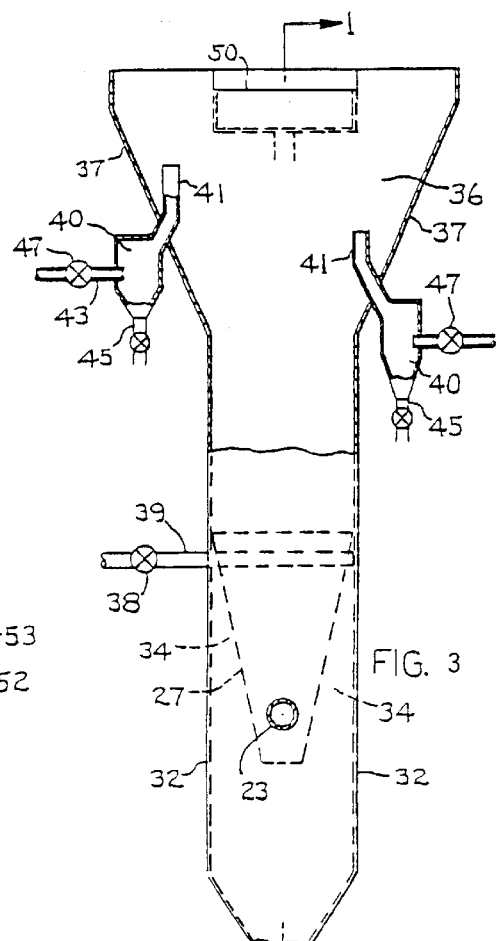
FIG. 3 is a sectional view taken essentially on line 2—2 in FIG. 2.
Figure 4:
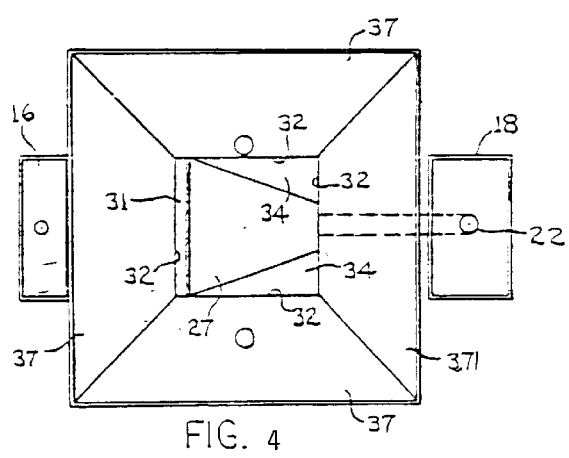
FIG. 4 is a top plan view of the apparatus of FIG. 2.
Figure 5:
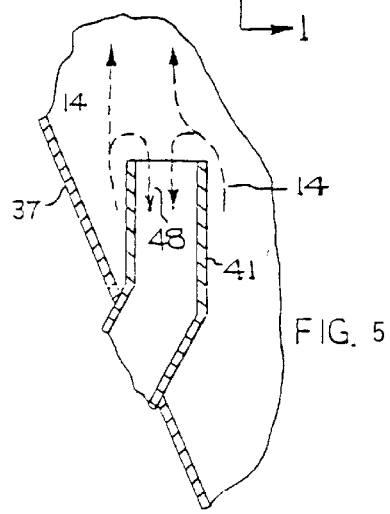
FIG. 5 is an enlarged view of a structural detail used in the apparatus of FIG. 2.

As shown in FIG. 3, two similar separation mechanisms are connected to the upper flaring section of the column. Each separating mechanism comprises a collecting chamber 40 connected to flaring section 36 of the column via an upstanding conduit 41. A liquid supply line 43 admits clear liquid to each chamber 40. Sized particles (with some liquid) are discharged from the separator chamber via a valved discharge outlet 45.

A valve 47 in each line 43 is adjusted so the water will flow up through conduit 41 at a rate which will prevent withdrawal of unwanted extreme fines but will permit withdrawal of desired size products. Although two of these intermediate sized withdrawal separator mechanisms are shown, additional units may be incorporated in the separator assembly.

If valve 47 is adjusted so that line 43 flow is slightly less than the flow through particle discharge outlet 45 than a slight down-flow of liquid through conduit 41 can be realized, with some associated increase in particle separation action. The two separation mechanisms are located at different elevations on the flaring section of column 12. Vertical velocities at the respective conduits 41 are therefore different, such that the respective conduits remove particulates in different size ranges. The upper conduit removes the finer size particles. Substantially clear effluent, slimes, or extreme fines are discharged over a weir 50 into box 16.

The drawings show single conduits 41 at each specific separation level; additional conduits can be provided at each given level.

During operation of the particle separator, coarse size particulates may be continuously withdrawn from column 12 through a valved outlet 50 at the lower end of the hopper 25.

The various control valves 38, 47, 50, etc. may be operated manually or automatically, using various known types of sensors, e.g. flow sensors, or pressure sensors, or particle concentration sensors. The control system can be reasonably simple.

Auxiliary water line 52 is used to regulate the flow through the column vertical section and is the means by which particle sizing is established. Adjustment of valve 53 to increase the flow through pipe 52 will result in an increased fluid up-flow through the vertical column 12. This will enable larger sized particles to be carried upwardly toward the separator mechanisms in flaring column section 36. Conversely, reducing the flow through pipe 52 will reduce the rate of flow of the up-flowing liquid in column 12, thereby reducing the particle sizes that can move upwardly through the column.

The coarse materials from the hydraulic classifier are discharged through valve 50. The middling materials from hydraulic classifier are discharged through opening 41. The coarse discharge from the hydraulic classifier is roughly less than $\frac{1}{8}$ inch in diameter, but greater than 50 mesh, as illustrated by block 9, and the material primarily contains ash. This material is discharged onto a de-watering screen and is combined with the stockpile of less than $\frac{3}{8}$ inch and greater $\frac{1}{8}$ inch material and both materials are de-watered by a de-watering screen, as illustrated by block 11.

An acceptable commercially available de-watering screen is made by Innovative Screening Technologies Company. The de-watered material constitutes a block sand product, as illustrated by block 13. The de-watering step may also be followed by other benefication techniques, such as a spiral to remove any impurities, such as coarse pyrites.

Material which exits the hydraulic classifier at the middling level at port 41 may contain ash, pyrites, carbon or other materials. This slurry is subjected to spirals, as illustrated by block 15. An acceptable commercially available spiral is made by Carpeo Company. These spirals separate the middling material based primarily on specific gravity. High specific gravity materials will report to the inside section of the spiral, as illustrated by block 17. The high specific gravity middling materials from the spirals are stockpiled, as illustrated by block 21.

The middle specific gravity middling material from the spiral center is fed to a de-watering screen, as illustrated by block 24. The middle specific gravity material will have a specific gravity from 2.4 to 2.7.

The low specific gravity middling material, such as ultra-lights, carbon and porous ash particles, as illustrated by block 26, e.g. specific gravity of 1.4 and less, reports to the outside of the spiral. These low specific gravity materials report to a sizing sleeve, as illustrated by block 29. In the sizing sleeve, coarse low specific gravity middling material is removed from the finer carbon material, as illustrated by block 33.

The coarse low specific gravity middling materials from the sizing sleeve are fed to the de-watering screen, illustrated by block 24, and are combined with the middle specific gravity material from the spirals. The resulting de-watering material is stockpiled as concrete or mid-size sand product, as illustrated by block 34.

The fines from the top of the hydraulic classifier exit port 16, as illustrated by block 35. These fines can contain fine ash particles, as well as cenospheres (spherical hollow particles). The fines are subjected to a stationary screen, as illustrated by block 38 to remove the cenospheres while the fine ash goes through the screen and is collected as fine ash product, as illustrated by block 39.

Effluent from the system described above can be recirculated for reprocessing.

The process described above can be wet or dry fed. The process utilizes magnetic separation for the removal of magnetics which can be detrimental to the final block sand product. The process utilizes a hydraulic classifier, preferably the Lewis Econosizer, to affect multiple size splits, as well as separate minerals based on specific gravity and shape. Particles vary in sizes, shapes and specific gravities report to discharge streams within the Lewis Econosizer, based on their settling velocities. The middlings from the Lewis Econosizer are separated, further utilizing spirals to produce heavy, mid-size and ultra-light product streams. The product streams are upgraded and screens are utilized for de-watering and size separation. The system may be operated in a closed water loop. The system produces many varied mineral products from a coal combustion ash pond which would go to waste creating environmental problems.

From the foregoing description of the preferred embodiment of the invention, it will be apparent that many modifications may be made therein. It should be understood, however, that this embodiment of the invention is an exemplification of the invention only and that the invention is not limited thereto. It is to be understood, therefore, that it is intended in the appended claims to cover all modifications as fall within the true spirit and scope of the invention.

What is claimed is:

1. A method for segregating ponded coal combustion material comprising the steps of:

removing the material from the pond;

feeding the material to a screening system, thereby segregating a first size material from the remainder of the material;

feeding the remainder of the material to a hydraulic classifier apparatus;

discharging coarse material from a first output of the hydraulic classifier and discharging middling size material from a second output of the hydraulic classifier;

segregating the middling size material by low, middle and high specific gravities utilizing spirals;

de-watering the middle specific gravity middling material;

feeding the low specific gravity middling material to a sizing sleeve where coarse low specific gravity middling material is segregated from fine low specific gravity middling material.

2. A method as set forth in claim 1, further including the step of de-watering the coarse low specific gravity middling material.

3. A method as set forth in claim 2, further including the step of stockpiling the de-watered coarse low specific gravity middling material with the de-watered middle specific gravity middling material to form a concrete or mid-size sand product.

4. A method for segregated ponded coal combustion material comprising the steps of:

removing the material from the pond;

feeding the material to a coarse primary screen, thereby segregating very coarse material from a first remainder of the material;

crushing the very coarse material and returning the crushed material to the primary screen;

feeding the material from the primary screen to a secondary screen for segregating a first size material from a second remainder of material;

removing iron bearing materials from the second remainder of the material;

feeding the non-iron bearing material to a hydraulic classifier, which classifies materials into coarse, middling and fines;

combining the coarse materials from the hydraulic classifier with the first size material and de-watering the combination of materials, thereby forming a block sand product;

feeding the fines from the hydraulic classifier to a stationary screen, thereby forming a fine ash product;

feeding the middling size material from the hydraulic classifier to spirals for segregating the middling size material by high, middle and low specific gravities;

passing the low specific gravity material over a sizing sleeve;

feeding the middle specific gravity middling material from the spiral and feeding the coarse low specific gravity middling materials from the sizing sleeve to a de-watering screen;

stockpiling the materials from the de-watering screen as concrete or mid-size sand product.

* * * * *